Figure 1:
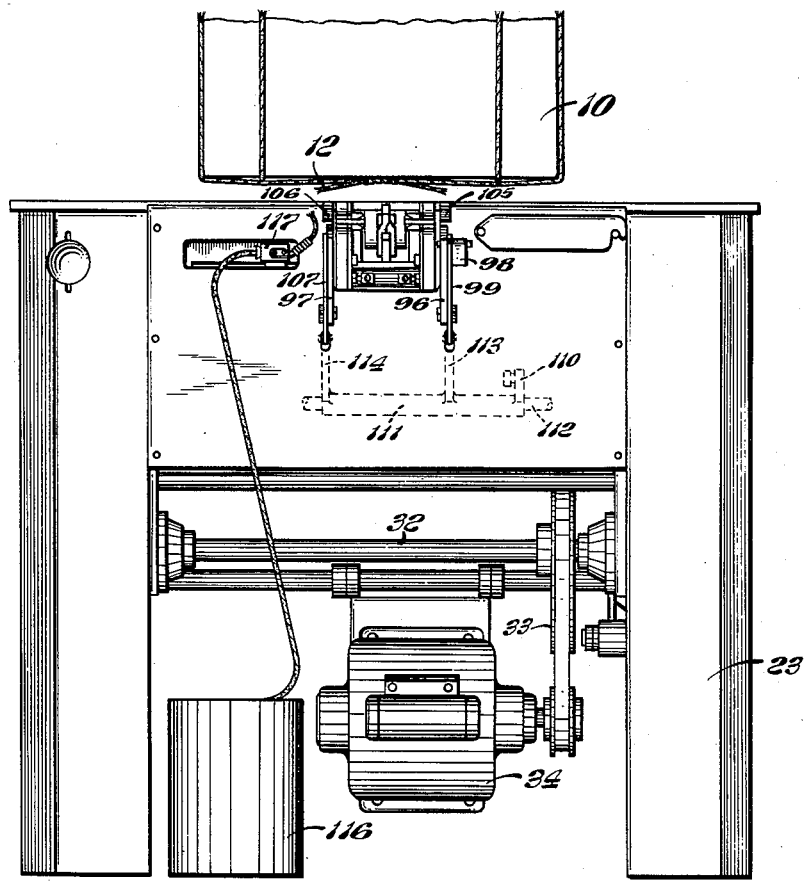

Oct. 2, 1956

G. N. WILLIS ET AL 2,765,003

TWINE JOINTING MACHINE

Filed March 5, 1952

10 Sheets-Sheet 1

INVENTOR.
Grant N. Willis &
BY Lionel H. Seccombe, Jr.
Kenway, Jenney, Witter & Hildreth
Attys.

Oct. 2, 1956

G. N. WILLIS ET AL 2,765,003

TWINE JOINTING MACHINE

Filed March 5, 1952

10 Sheets-Sheet 3

INVENTOR.
Grant N. Willis
BY Lionel H. Coconut Jr.
Kinney, Janney, Witter & Mitchell
Attys.

INVENTOR.
Grant N. Willis & Lionel N. Leccomte Jr.
BY
Kenway, Jenney, Witter & Hildreth,
Attys.

Oct. 2, 1956  G. N. WILLIS ET AL  2,765,003
TWINE JOINTING MACHINE
Filed March 5, 1952  10 Sheets-Sheet 8

INVENTOR.
Grant N. Willis & Lionel H. Seccomb Jr.
BY
Kenway, Jenney, Witter & Hildreth.
Attys.

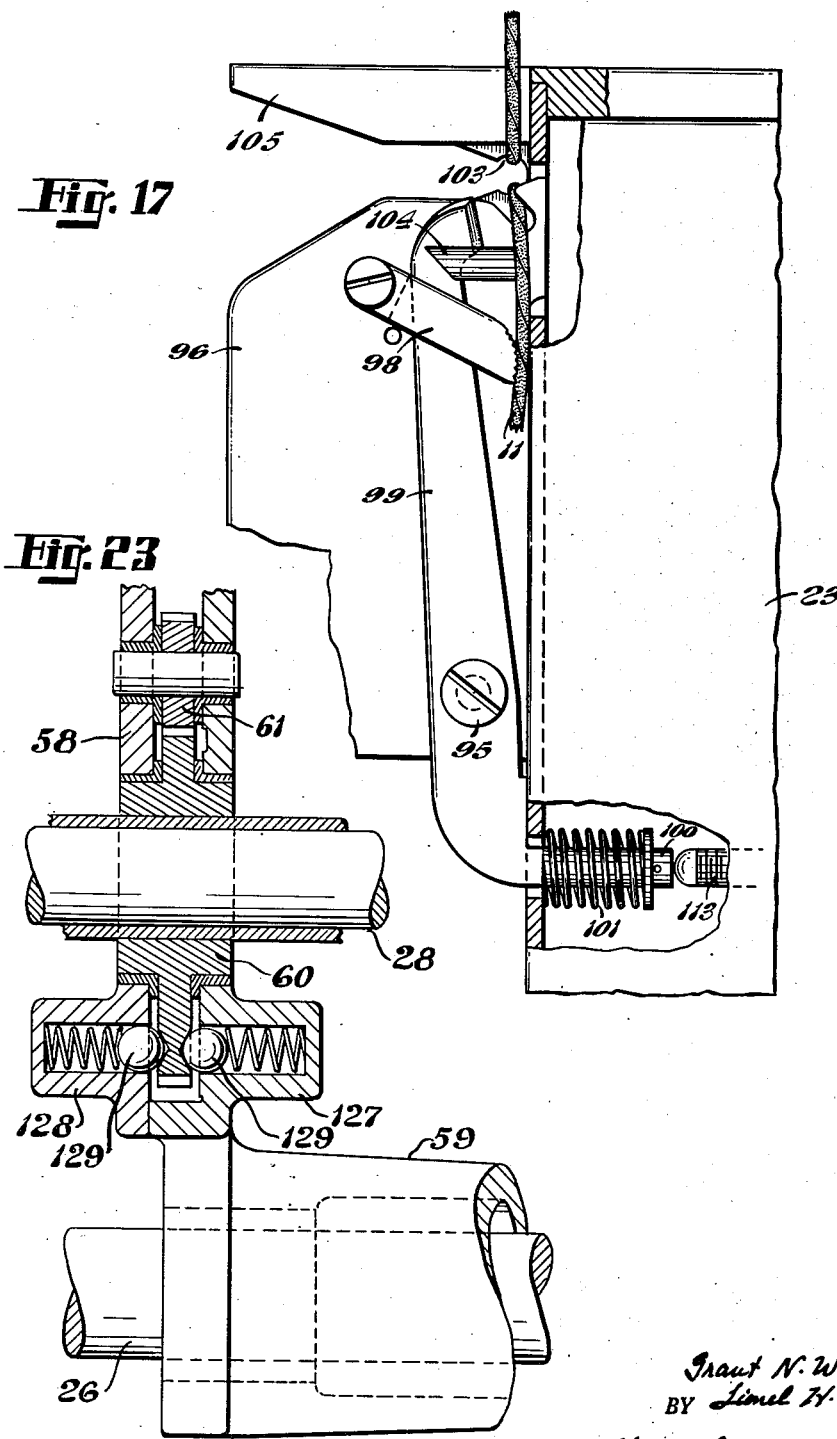

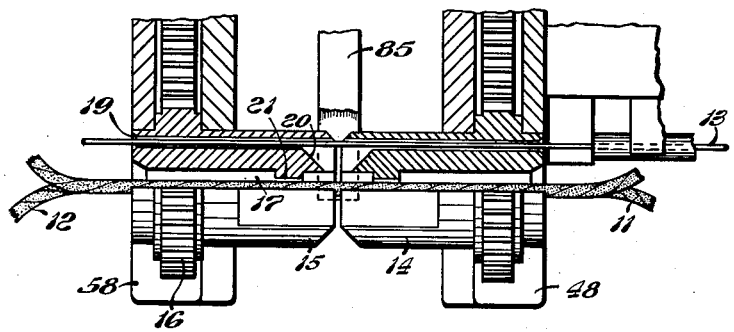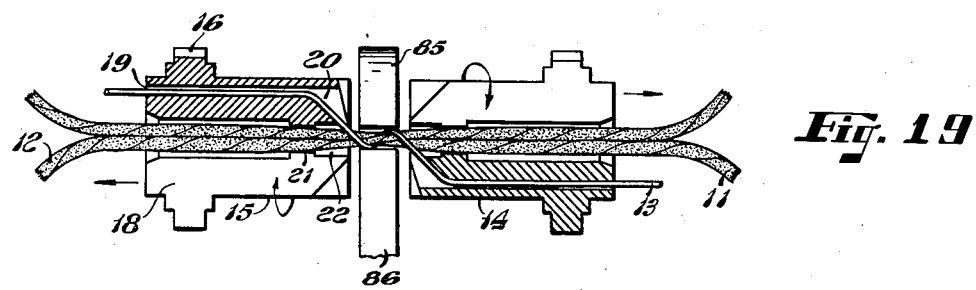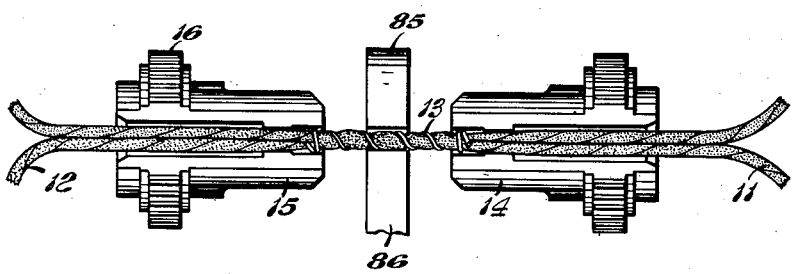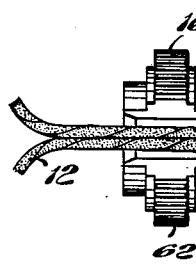

United States Patent Office 2,765,003
Patented Oct. 2, 1956

2,765,003

TWINE JOINTING MACHINE

Grant N. Willis and Lionel H. Seccombe, Jr., Bristol, Conn., assignors, by mesne assignments, to United Shoe Machinery Corporation, Flemington, N. J., a corporation of New Jersey Application March 5, 1952, Serial No. 274,946

21 Claims. (Cl. 140—93)

This invention comprises a new and improved machine for securing together two ends of twine or other cordage for transmitting straight line tension between the parts leading to the joint.

When the ends of twine are joined by a conventional knot, the joint is usually not reliable for much for than 50% of the strength possessed by the twine in which the knot is made, the variations in actual knot efficiency depending largely on such factors as the kind of fiber, the size of twine, the amount of twist, and lubrication. The main reason why a knot is not efficient is that all the fibers do not share equally in the load when tension is applied. When the load is applied, the outside fibers are more highly stressed and fail first, and the inside fibers fail as the load ais transferred to them, so that at no time do all the fibers share equally in the total load.

An object of the present invention is to provide a machine for automatically forming a joint in which the two end parts of the binding or wrapping twine are arranged in overlapping relation and extend thence in opposite directions, while a short piece of continuous stiffly bendable wire is wound about the twine in spaced turns encircling and constricting its overlapping ends. In this joint all the fibers are comparatively parallel to each other. As load is applied, the highly stressed fibers are permitted to slip slightly with respect to the other fibers thereby transferring part of the load to them. In this equalizing action all the fibers are permitted to share in the total load and the joint thus produced has been found very high in efficiency.

Preferably and as herein shown, the joint is characterized by end loops of wire which are close wound and are included for finish to avoid sharp protruding ends. They contribute to the strength of the joint, but its strength comes principally from the snubbing action of the center turns. As the wire is wound about the overlapping ends of the twine, the twine fibers are forced to assume a spiral formation thus providing a substantial snubbing action as the load is applied.

The machine of the present invention is characterized by wire-twisting spindles having open twine-receiving throats and an eccentric or offset wire passage. The spindles are arranged for rotation as well as for longitudinal movement toward and from each other, and these two motions are combined first to wrap the wire about the overlapping ends of the twine in space helical turns, then in close wound turns, and finally the spindles rotate to smooth in the two ends of the wire against the close wound turns therein.

Other features of the machine comprise automatic wire feeding and cutting mechanism adapted to supply a predetermined length of wire to the wire-twisting spindles and to cut off a predetermined length of the wire when it has been so supplied.

Grippers are also associated with the wire-twisting spindles and operated automatically to engage the overlapping ends of the twine and the wire at substantially the center of the joint and very early in the wire-twisting rotation of the spindles. The grippers are effective to hold the work stationary in operative position at the critical point and insure tight winding of the wire helix.

Another important feature of the invention consists broadly in means for tensioning the twine and pulling it tight about the article or package which is to be bound. As herein shown a clamping device is provided for holding the free end of the twine while cam operated mechanism is provided for gripping the twine at an intermediate point and pulling it tight prior to the rotation of the wire-twisting spindles.

As a further feature of the invention the machine herein shown includes cutting mechanism for cutting the twine at a point in its passage from the source of supply to the joint and, if desired, cutting means is also provided for trimming the free end of the twine so that both of the cut ends shall be trimmed close to the outer turns of the wire helix. As herein shown the cutters are operated simultaneously in timed relation to the operation of the spindles and immediately upon the completion of the joint.

Other features of the machine consist in the cooperative combination of the various mechanisms above referred to and in their organization in which they are operated from a single cam shaft to carry out the various steps of tensioning the twine, presenting and cutting off the wire employed in the joint, gripping the overlapping ends of the twine, rotating the wire-twisting spindles to form the helix and to finish its ends, to cut and trim the twine adjacent to the joint, and finally to return the elements of the machine to initial position in readiness to receive a new charge of wire and twine.

Figure 2:
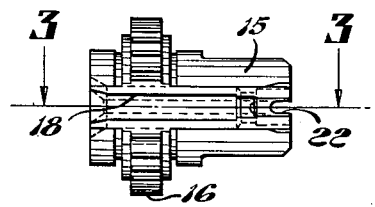
Figure 3:
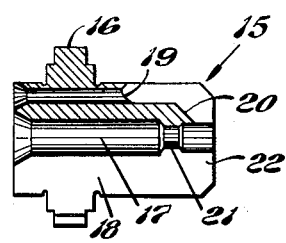
Figure 4:
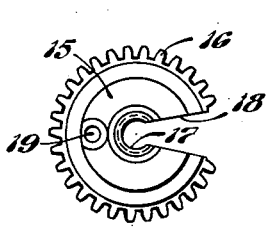
Figure 5:
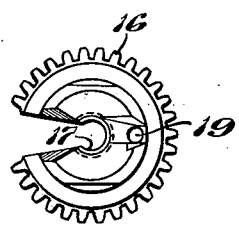
Figure 6:
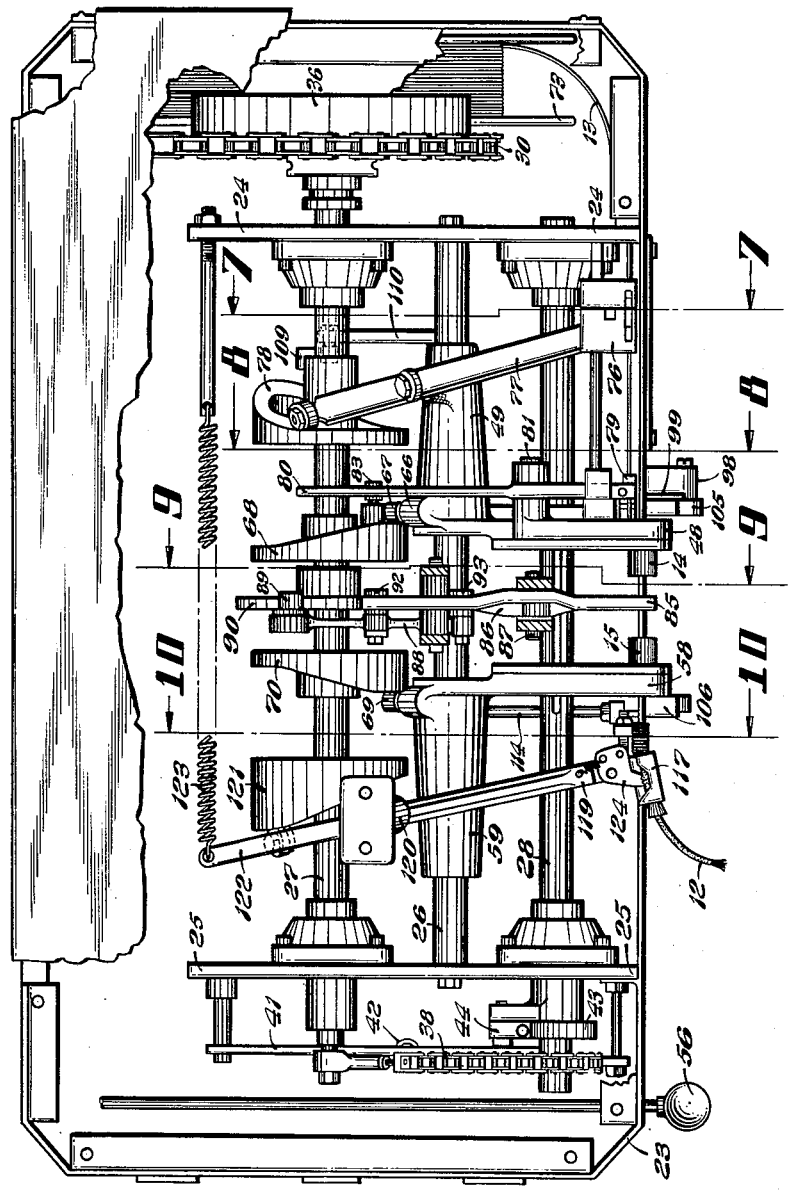
Figure 22:
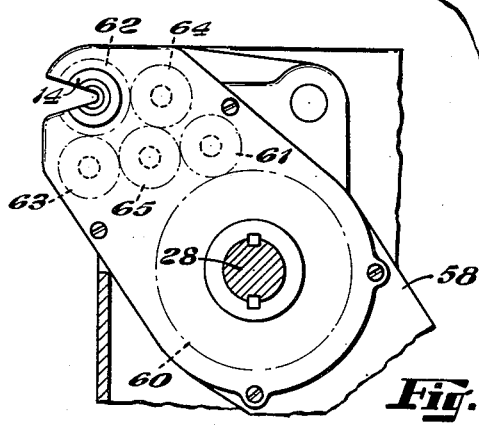
Figure 11:
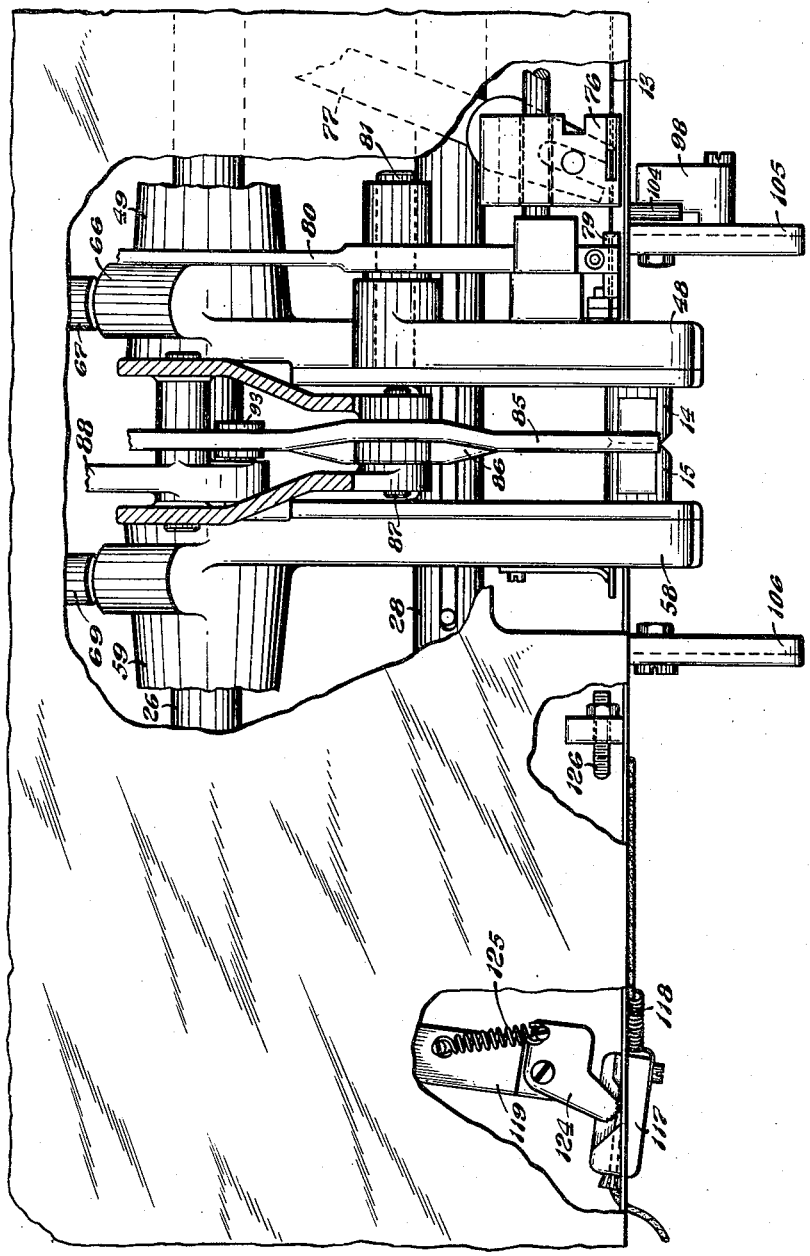
Figure 12:
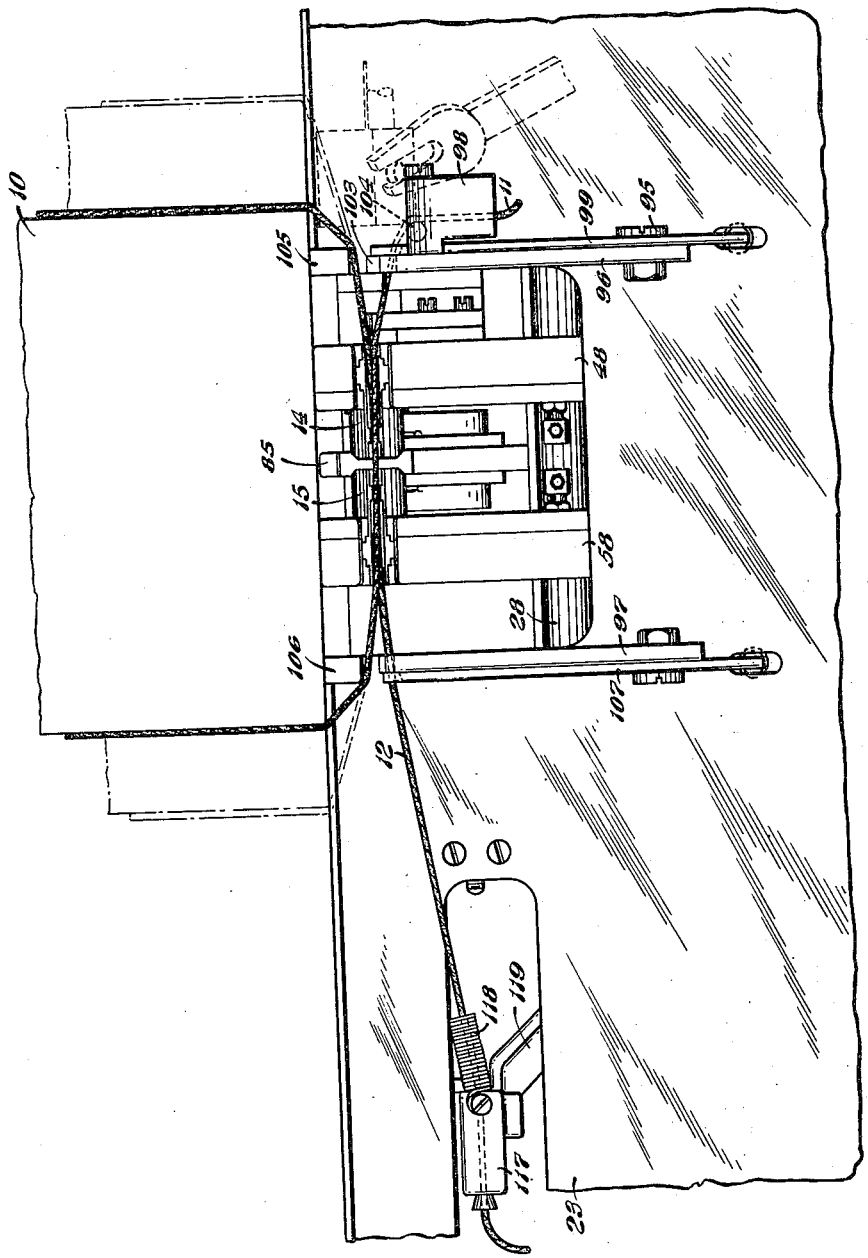
Figure 13:
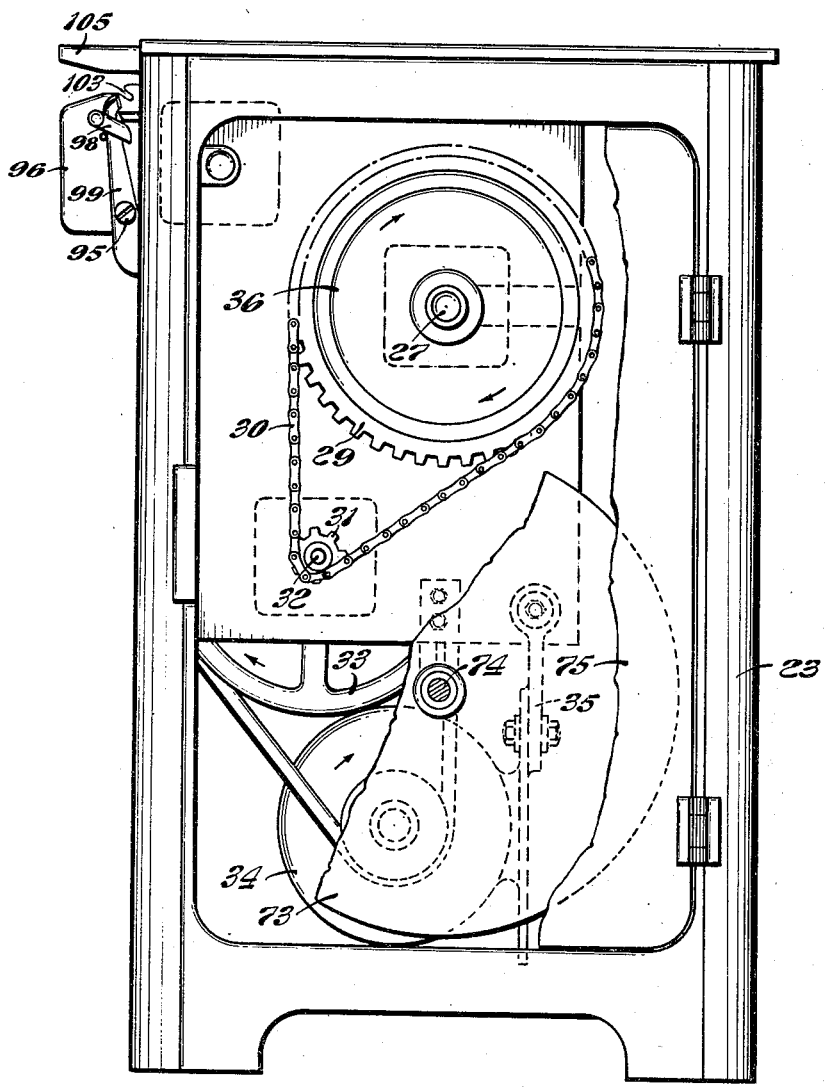
Figure 14:
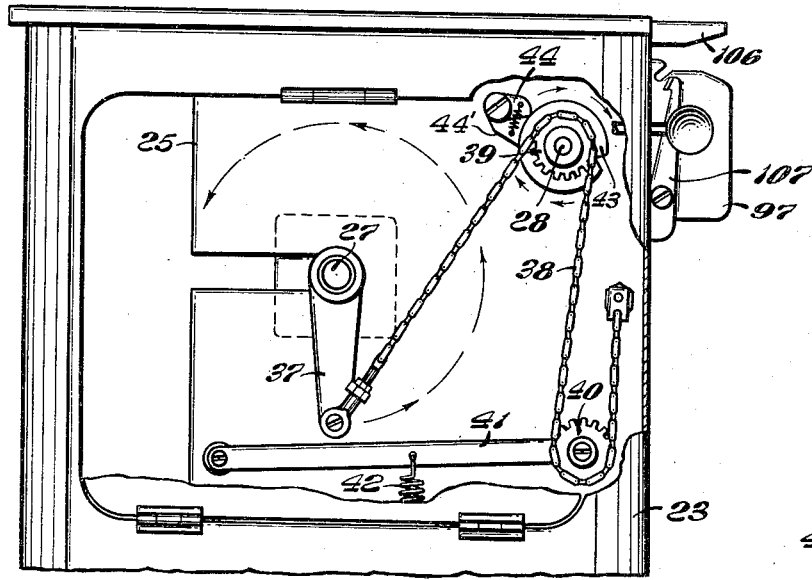
Figure 15:
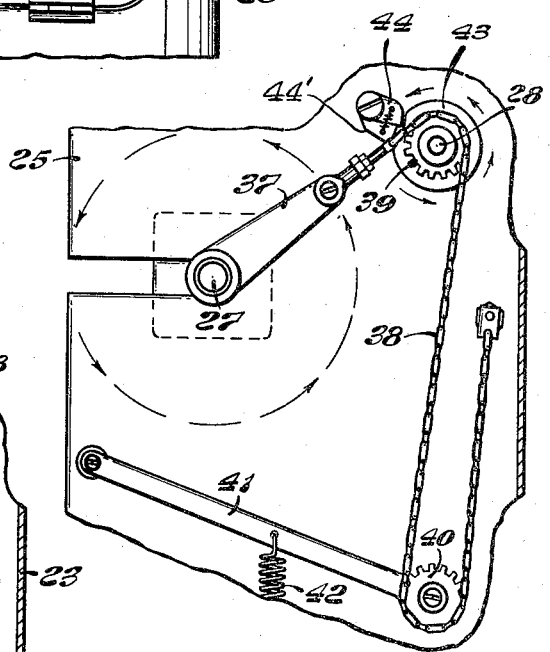
Figure 16:
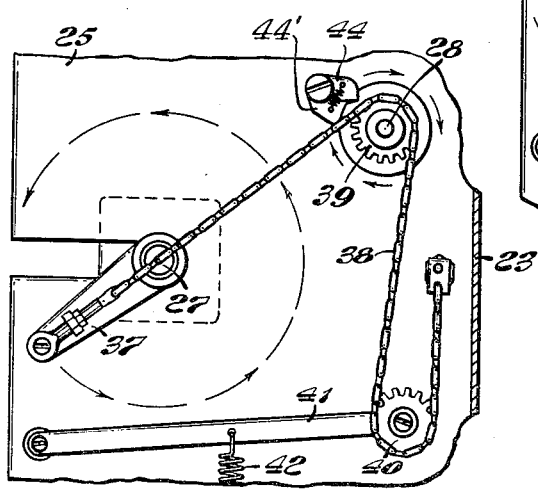

These and other features of the invention will be best understood and appreciated from the following description of a preferred embodiment thereof, selected for purposes of illustration and shown in the accompaning drawings in which:

Fig. 1 is a view of the machine in front elevation showing a package lifted slightly from operative position, Fig. 2 is a view in elevation of the left hand wire twisting spindle, Fig. 3 is a sectional view on the line 3—3 of Fig. 2, Fig. 4 is a view of the spindle of Fig. 2 as seen from its left end, Fig. 5 is a view of the spindle as seen from its right end, Fig. 6 is a plan view of the machine shown with the top broken away, Figs. 7, 8, 9 and 10 are sectional views, respectively, on the lines 7—7, 8—8, 9—9 and 10—10 of Fig. 6, Fig. 11 is a fragmentary plan view on a somewhat larger scale than Fig. 6, Fig. 12 is a fragmentary view of the machine in front elevation showing a package in operative position, Fig. 13 is a view of the machine as seen from the right hand end with portions broken away, Figs. 14, 15 and 16 are fragmentary views of the machine as seen from the left end showing the sprocket driving mechanism in somewhat different positions, Fig. 17 is a fragmentary right end view showing details of the twine cut-off, Figs. 18, 19, 20 and 21 are detail views showing the wire twisting spindles in successive positions which they occupy in the cycle of the machine, and Fig. 22 is a fragmentary view in elevation of the left hand spindle carrier, Fig. 23 is a fragmentary view of the same partly in longitudinal section.

The twine joint made by the illustrated machine is itself the subject-matter of my co-pending application Ser. No. 221,485, filed April 17, 1951, now United States Letters Patent No. 2,605,603 dated August 5, 1952. As best shown in Figs. 12 and 21 the cord or twine is wrapped about the article, for example the rectangular package 10 shown in Fig. 12, and the free end 11 of the twine is laid in parallel contact with a portion 12 of the twine leading from the source of supply for a distance of three or four inches. A piece of wire 13, for example steel wire 0.06" in diameter, is then wrapped tightly around the overlapped lengths of twine forming a helix herein shown as comprising four intermediate turns of uniform pitch and a pair of close wound turns at each end of the helix. The free ends of the wire are wrapped tightly and bent snugly into the enclosed mass of twine and present no projecting points that might scratch a surface contacting the joint.

The immediate instrumentalities in the machine operated to form the joint above described comprise right and left spindles 14 and 15. The left spindle 15, as best shown in Figs. 2–5, has a cylindrical body carrying an integral or rigidly affixed pinion 16 and has a central axial bore 17, countersunk at its outer end. A portion 21 of the bore is constricted adjacent to its inner end. A sector-shaped throat 18 leads radially in from the front wall of the spindle and, opening into its central bore 17, provides a passage through which the overlapping twine may be presented to the spindle. The throat extends through the pinion 16 and is flared somewhat at its outer end to facilitate this step. The spindle 15 is also provided with an eccentric wire passage 19 which is also countersunk at its outer end. The major part of its length is parallel to the central bore 17 of the spindle while at its inner end 20 it is deflected sharply toward the axis of the spindle and leads into the bore between its inner end and the constricted portion 21 therein. The spindle is also provided at its inner end face with a cross slot 22 that intersects the inclined inner end of the wire passage and also the central bore. It is the inner longitudinal edge of this slot 22 that actually leads the wire about the overlapped twine when the spindle is rotated and the wire drawn out of the wire passage 19 where it is initially placed.

The right spindle 14 corresponds in all particulars to the left spindle except that it is reversely placed and is geared to be driven in the opposite direction. As shown in Fig. 19 the right spindle 14 revolves toward and the left spindle away from the observer, both starting from an initial position in which the twine receiving throats face the operator of the machine. The spindles are also moved horizontally or axially toward and from each other in forming the helical and close wound turns of the wire and for other purposes that will be explained.

The two spindles above described constitute the operative instrumentalities of the machine and are embodied in its organization in a manner which will now be described. The machine has a rectangular box-like frame 23 with a flat top upon which the package 10 or other article is placed for the twine jointing operation. The frame is provided with a pair of vertical parallel internal walls 24 and 25. Between these walls extends a stationary horizontal guide shaft 26 and to the walls are secured bearings for a driven cam shaft 27 and a splined spindle driving shaft 28. These three shafts are disposed in parallel relation as shown in Fig. 6. The driven cam shaft 27 extends to the right hand end of the machine as shown in Fig. 13 where it is provided with a sprocket wheel 29 driven by a chain 30 from a small sprocket wheel 31 on a countershaft 32 having a large pulley 33 for a V-belt driven by a motor 34 which is fast upon a suspended bracket 35.

At its right hand end the shaft 27 is provided with a one-revolution clutch of which the loose member is a drum 36 fast to the sprocket wheel 29. Any conventional one-revolution clutch may be employed and since its details form no part of the present invention they are not herein shown.

At its left end the shaft 27 is provided with a crank arm 37 and to this is adjustably connected a sprocket chain 38. The chain leads from the crank arm 37 around a sprocket 39 loose upon the left hand end of the splined shaft 28, then downwardly about a sprocket 40 which is carried by an arm 41 pivotally mounted on the transverse wall 25 and always urged downwardly by a tension spring 42. Rotatably mounted upon the shaft 28 and fast to the sprocket 39 is a ratchet disk 43 having a single notch in its periphery with which cooperates a pawl 44 held against the periphery of the disk by a spring. The pawl 44 is carried by an arm 49' which is fast to the shaft 28.

It will be apparent that when the crank arm 37 is rotated from its initial position as shown in Fig. 14 in a counterclockwise direction, the sprocket chain will be drawn over the sprocket 39 in a direction to rotate the sprocket and ratchet disk in a clockwise direction and that this rotation will continue until the crank arm 37 has rotated 100° into the position shown in Fig. 15. In this movement the pawl 44 passes idly over the ratchet disk and no movement is imparted to the shaft 28. This rest interval allows time for the wire feed, the application of tension to the twine and the bringing together of the spindles. As the crank arm is rotated beyond the position shown in Fig. 15, it will pull the chain 38 in the opposite direction thereby rotating the ratchet disk in a counter-clockwise direction. The pawl now engages the notch in the ratchet disk 43 and the shaft 28 is turned in a counter-clockwise direction through 180° rotation of the arm 37. The shaft 28 never rotates in clockwise direction because the ratchet disk will drive the pawl arm 44' in only one direction. It will be seen therefore that continuous rotation of the shaft 27 initiated by tripping the one-revolution clutch 36 is effective to rotate the splined shaft 28, a step at a time in counter-clockwise direction.

The splined shaft 28 has gear connections with the pinions of the wire-twisting spindles through connections which will now be described. The right hand spindle 14 is rotatably mounted in a carrier 48 shown in elevation in Fig. 8. The flat top of the frame is cut away to receive the top edge surface of the carrier 48 in substantially flush relation and to permit it to be moved transversely in the operation of the machine. The carrier extends downwardly and rearwardly from the spindle 15 and is provided with a transversely extending sleeve portion 49 which slides transversely on the shaft 26. It also has sliding engagement with the splined shaft 28 to which it is keyed. Within the carrier 48 is provided a gear 50 keyed to the shaft 28 and arranged to drive an intermediate gear 51 journaled within the carrier. The gear 51, in turn, meshes with a pair of intermediate gears 52 and 53. The gears 52 and 53 mesh with the spindle pinion 16 at two separate points and thus maintain continuous driving engagement with it in all positions of the spindle and regardless of the gap formed by the throat 18. For example, when the gap in the pinion registers with the intermediate gear 52, the intermediate gear 53 will drive the pinion 16, and when the gap registers with the intermediate gear 53 the other gear 52 of the pair will continue to drive. It will be seen, therefore, that a single revolution of the splined shaft 28 in one direction as that shaft is being rotated by the sprocket chain 38 will rotate the spindle several turns in one direction.

The left hand wire-twisting spindle 15 is similarly mounted in a carrier 58 having a sleeve 59 slidable upon the shaft 26 and containing a gear 60 as shown in Fig. 22. The gearing in this carrier is similar to that already described in the carrier 48 except that the spindle 14 is driven in the reverse direction from the spindle 15. To this end the splined shaft 26 is provided with a gear 60 meshing with a small intermediate gear 61. The spindle pinion 62 in this case is driven by two intermediate gears 63 and 64, and these in turn are driven by an intermediate gear 65 which meshes with the intermediate gear 61 already mentioned. The driving gear connections to the wire-twisting spindles are completely enclosed in the carriers 48 and 58 and are maintained in operative condition in all transverse positions of the two carriers by reason of their splined connection with the shaft 28.

The carriers 48 and 58 are moved transversely and controlled in their position by mechanism which will now be described. The carrier 48 is provided at its rear end with a boss 66 containing bearings for a cam roll 67 arranged to run upon the face cam 68 fast upon the cam shaft 27. These cams are so timed as to bring the wire-twisting spindles 14 and 15 into their separated position as shown in Fig. 6 when the shaft 27 is brought to rest. The contour of these cams is such as to separate the spindles during their rotation through the position shown in Fig. 19 to their position of maximum separation as shown in Fig. 20, and then to move the spindles together again into the position shown in Fig. 21 for the purpose of smoothing the ends of the wire 13 in the close wound turns at opposite ends of the joint.

Figure 7:
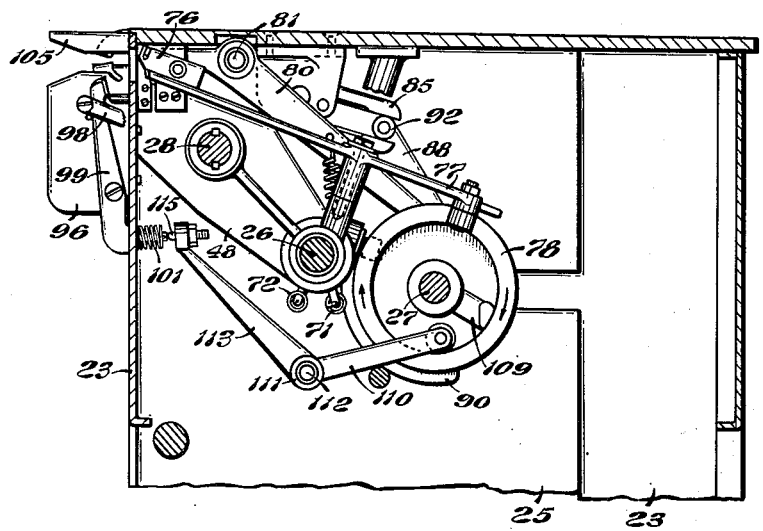
Figure 8:
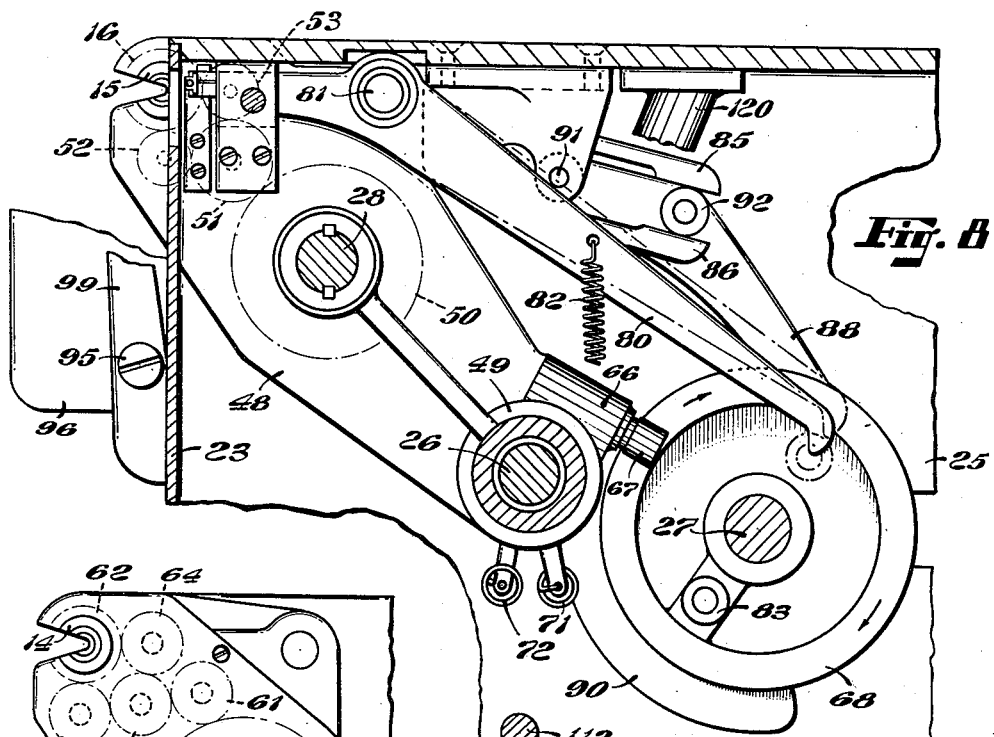

The carrier 48 has an arm projecting downwardly from its lower end to which is attached a horizontal tension spring 71 tending always to move the carrier toward the left and maintain its cam roll 67 in contact with the face cam 68. The carrier 58 has a corresponding downwardly extending arm to which is attached a horizontal tension spring 72 which urges the carrier always toward the right and holds its cam roll 69 in contact with the face cam 70. These springs are shown in Figs. 7 and 8 and are fastened at their outer ends to the partitions 24 and 25 respectively although they are hidden in Fig. 6 beneath the sleeves 49 and 59 of the carriers and the shaft 26.

The wire 13 required in the operation of the machine is drawn from a reel 73 mounted in the frame of the machine at its right hand side upon a short shaft 74 projecting inwardly from a bracket which is secured to a door 75 normally closing a large opening in that end of the frame. The wire 13 passes forwardly inside the frame and then transversely through a gripping device 76 loose on the forward end of a feed lever 77. The lever 77, in turn, is journaled upon a stud carried by the sleeve 49 of the carrier 48 as shown in Fig. 6 and is bodily movable transversely with the carrier. It is provided at its rear end with a cam roll running against a face cam 78 on the cam shaft 27. The gripping device is reciprocated in a straight line path and advances the wire to a stationary throat 79. Adjacent to the end of this throat and cooperating therewith is a cut-off lever 80 mounted upon a pivot 81 supported by webs beneath the table top of the frame, as shown in Fig. 8. The forward and cutting end of the lever is maintained elevated in operative position by a tension spring 82 connected to the rear end of the lever and against the tension of which the lever is elevated once in every revolution of the cam shaft 27 by a cam roll 83, all as shown in Fig. 8. The cam is timed so that after the required predetermined length of wire has been fed to the spindles 14 and 15, the cut-off lever 80 is operated and the wire severed. The spindles at this time are located in their contiguous position as shown in Fig. 18 and the cut length of wire projects about ⅜" on each side beyond the outer ends of the spindles 14 and 15.

Figure 9:
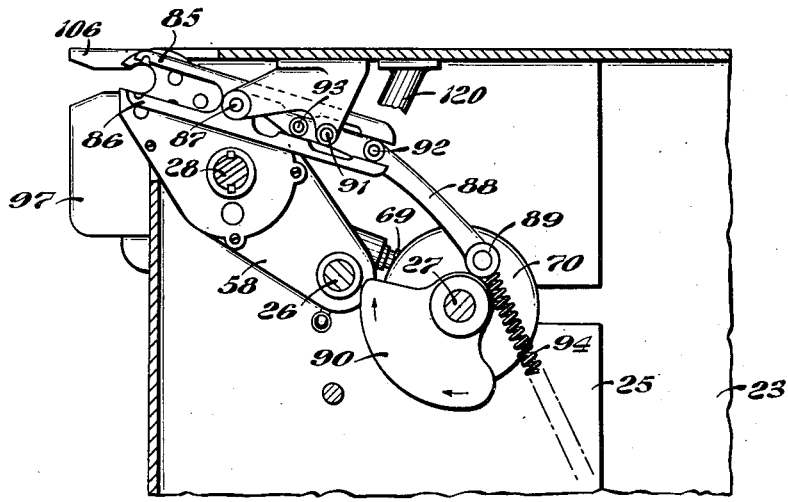
Figure 10:
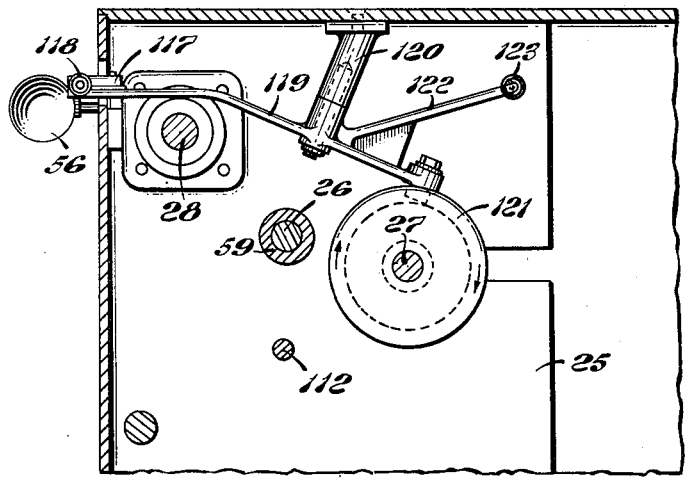

Gripping arms 85 and 86 normally occupying an inoperative position at the rear side of the spindles, as indicated in Fig. 18, are arranged to move forward as soon as the spindles have been separated sufficiently to admit them and to grip the overlapping ends of the twine and wire during the wire twisting operation as indicated in Figs. 19–21. The gripping arms are mounted to rock about a pivot 87 supported in a web projecting downwardly from the table top as shown in Figs. 8 and 9. They are opened and closed by a cam lever 88 pivoted at 91 and carrying at its rear end a cam roll 89 which runs upon the surface of a cam 90 fast on the cam shaft 27. A roll 92 projects from the cam lever 88 in position to engage the rear end of the upper gripping arm 85 and to swing it downwardly when the cam lever is rocked. The cam lever is also provided with a second roll 93 located in advance of its pivot 91 which correspondingly acts on the lower gripping arm 86 to swing it upwardly in gripping engagement with the work.

A pair of forwardly projecting guide plates 96 and 97 are secured to the front face of the machine frame and upon the right hand plate is a pivoted twine clamp 98 arranged to engage and hold the free end of the twine against a portion of the front plate of the frame during the entire cycle of the machine. Also pivotally mounted on the guide plate 96 is a cutter arm 99 arranged to swing on a pivot stud 95 and having its lower end extended inwardly through an aperture in the front plate of the frame as a stem 100. A compression spring 101 encircles the stem 100 and is interposed between a washer thereon and the inner face of the front plate, tending always to rock the cutter arm 99 in a counter-clockwise direction and hold it in inoperative position, as best shown in Fig. 17. The guide plate is provided at its upper end with a notch 103 through which two strands of the twine are brought and of these the free end 11 is carried downwardly into shearing range of the cutter arm 99 over a guide stud 104 and into range of the pivoted clamp 98. A guard arm 105 projects outwardly flush with the table top and in line with and above the guide plate 96. The arm 105 and the upper edge of the plate 96 are beveled so as to form a converging throat into which the twine may be readily passed by the operator.

The left hand guide plate 97 is provided with a pivotally mounted cutter arm 107 corresponding to the cutter arm 99 already described and like it having an inwardly directed stem at its lower end which passes through the front plate of the frame where it is encircled by a compression spring corresponding to the spring 101 and held by it in inoperative position.

The cutter arms 99 and 107 are operated simultaneously by a cam arm 109 fast on the cam shaft 27 and shown in Fig. 6 and 7 acting on a cam lever 110 which is fast to a sleeve 111 rotatable on a transverse shaft 112 extending between the walls 24 and 25. A pair of arms 113 and 114 extend forwardly from the sleeve 111 and each is provided with an adjustable contact screw 115 located in alignment with the inwardly directed stem 100 of the cutter arm 99 and the corresponding stem of the cutter arm 107. The cam 109 is so timed as to cause this operation to occur immediately after completion of the joint.

An ample supply of twine to be used in the machine is placed within a cylindrical container 116 located within the frame and shown in Fig. 1. The twine passes upwardly from this container to a block 117 which has a longitudinal passage for the twine and carries a flexible coiled wire guide 118 through which the twine passes on its way to the notch provided by the left hand guide plate 97 and the guard plate 106 above it. The operator may grasp the end of the twine at the guide 118, pass it around the package 10, and anchor its free end beneath the clamp 98. In this operation the twine is placed in the passage of the wire-twisting spindles 14 and 15. The free end 11 of the twine is led downwardly as shown in Figs. 12 and 17 into range of the cutter arm 99, while that portion of the twine passing around the package 10 is led outwardly out of the range of the cutter. Similarly, on the other side of the package the portion 12 of the twine is guided in a path within range of the cutter arm 107, whereas the twine passing about the package 10 is directed upwardly out of the range of the cutter arm 107.

The block 117 is carried at the forward end of a cam arm 119 mounted to rock upon bearings provided by a bracket 120 projecting downwardly from the table top of the frame. At its rear end the cam arm 119 carries a cam roll which runs against the face of a cam 121 on the cam shaft 27. The cam arm 119 is provided at its rear end with an upwardly extending branch 122 to which is secured one end of a long tension spring 123. The other end of this spring is secured to a rod adjustably secured in the partition 24.

A portion of the twine passage in the block 117 is cut away to expose the twine and a dog 124 controlled by a tension spring 125 is pivotally mounted on the cam arm 119 in position to bite and hold the twine in the block 117 when permitted to do so. The path of the cam arm 119 is such as to bring the dog 124 into contact with an adjustable abutment screw 126 as shown in Fig. 11 when the block 117 is carried to the right hand extremity of its path of movement. The machine comes to rest with the block in this position and the dog released as shown in Fig. 6, thus permitting the operator to draw the twine freely through the block 117 and to wrap it about the package. As soon, however, as the machine is started, the cam arm 119 is swung toward the left, the dog 124 engages the twine, and as the cam arm moves to the left, the twine which has been wrapped about the package is placed under substantial tension, that is, all the twine between the clamp 98 and the block 117 is tensioned by having the portion engaged by the block 117 drawn toward the left for the full stroke of the cam arm determined by the spring 123.

As shown in Fig. 23 the carrier 58 which constitutes a casing for the spindle gears is formed with a pair of oppositely disposed bosses and each containing a ball spring pressed against the opposite sides of the gear 60 and the gear is provided with corresponding sockets in which the balls fit. These sockets are so located that when the balls are seated the wire twisting spindle 15 will be held in the desired initial position with its throats outwardly directed. The balls are forced out of their sockets when the gear 60 is driven in the regular cycle of the machine. The housing 48 is provided with similar means (not shown) for holding the gear 50 in its initial position. Incidentally, the spline shaft itself is stopped always in a predetermined position.

The operation of the machine will be clear from the foregoing description but may be briefly summarized as follows: The clutch which may be tripped by a button 56 through conventional connections, which are not shown, brings the machine to rest with the wire-twisting spindles in open position with the throats directed toward the front of the machine to receive the overlapping ends of twine. This may be freely drawn through the tension block 117 which occupies the right hand position with the dog 124 released. The free end of the twine is led downwardly and anchored by the clamp 98.

The clutch is now tripped and the cam shaft 27 makes one revolution. The spindles are first moved together into the position of Fig. 18, the wire gripping device 76 is immediately moved to feed the wire 13 to the wire passages of the spindles and a predetermined length of wire is cut off by the wire cutter 80. At the same time the twine tensioning block 117 is moved to the left and the twine pulled tight about the package from its anchored free end. The wire-twisting spindles 14 and 15 now begin to rotate in opposite directions and to separate as indicated in Fig. 19, permitting the grippers 85 and 86 to grip the wire and the overlapping ends of the twine at the center of the joint and hold it against turning. The spindles continue to rotate in opposite directions and to separate under the control of the face cams 70 and 78, at first rapidly to form the intermediate turns of the wire helix and then slowly in forming the close wound terminal turns until they reach a position of maximum separation as shown in Fig. 20. While still rotating the spindles are then moved toward each other, wiping the close wound turns into finished condition as suggested in Fig. 21. At this point the joint is finished and the twine cutters 99 and 107 are simultaneously operated to trim the twine at both ends of the joint. Meanwhile the spindles return to their initial position leaving the finished joint free to be removed from the twine passages in the spindles and the machine is brought to rest in readiness for a new cycle of operations.

Having thus disclosed our invention and described in detail a preferred embodiment thereof, we claim as new and desire to secure by Letters Patent:

1. A twine jointing machine including in its organization a pair of spindles having central aligned twine passages and eccentric longitudinal wire passages intersected by a transverse slot in the end face of the spindle which provides a longitudinal wire-wrapping edge in each spindle, and power driven gearing for rotating the spindles in opposite directions.

2. A twine jointing machine comprising a pair of spindles mounted to rotate in opposite directions about a common axis, each spindle having a central bore, an offset wire passage and a twine receiving slot opening through one side of the spindle, a wire cutter located at the outer end of one spindle, a twine cutter located at the outer end of the other spindle, and means for supplying wire to the wire passages of the spindles.

3. A twine jointing machine comprising a pair of aligned rotary spindles initially located in contiguous position and having axial twine passages and eccentric wire passages, automatic means for delivering a predetermined length of wire to said eccentric passages, means for separating the spindles, grippers operating between the adjacent ends of the spindles to engage the wire-wrapped joint formed by rotation of the spindles, gearing for rotating the spindles in opposite directions, and cam operated means for moving the spindles axially while they are being rotated in opposite directions.

4. A twine jointing machine comprising a pair of cooperating wire-twisting spindles having radially open axial twine passages and eccentric wire passages therein, automatic mechanism for tensioning overlapping portions of twine placed in said twine passages, and means for rotating the spindles in opposite directions while the twine is maintained under tension thereby wrapping wire about the tensioned portions of the twine.

5. A twine jointing machine as described in claim 4 having also a power operated twine cutter located adjacent to the spindles.

6. A twine jointing machine comprising a pair of wire twisting spindles having spaced parallel twine and wire passages therein, a shaft carrying a sprocket wheel and having a separate geared connection with each spindle, a sprocket chain fast at one end, and a power-driven crank for controlling movement of the chain with respect to said sprocket wheel.

7. A twine jointing machine comprising cooperating wire-twisting spindles having spaced parallel longitudinal twine and wire passages therein, means for feeding wire to the wire passages, cam operated means for moving said spindles axially into adjacent positions and for thereafter separating the spindles, grippers movable to engage overlapping portions of twine lying between the separated spindles, and power-operated mechanism for oppositely rotating the spindles in their separated positions.

8. A twine jointing machine comprising a pair of wire-twisting spindles having aligned wire passages and parallel twine passages with side opening throats, a shaft having geared connections with both spindles, a ratchet disk mounted loosely on the shaft and a pawl driven by the disk and being itself connected to the shaft for driving it from an initial position in which the spindle throat is directed outwardly in the machine, a sprocket carried by the shaft and connected to the ratchet disk, a cooperating sprocket chain meshing with the sprocket, a driven crank connected to the chain for drawing it back and forth upon the sprocket, and means for maintaining spring tension upon the chain.

9. A twine jointing machine comprising a pair of cooperating wire-twisting spindles having aligned wire passages and parallel twine passages and each provided with a driven pinion, the spindles and their pinions having side-opening throats therein, and geared driving connections to each spindle including separate gears meshing with each driven pinion at two separate points in its circumference whereby a driving connection with the spindle pinions is always maintained in all positions of the throat therein.

10. A twine jointing machine comprising cooperating rotary wire-twisting spindles mounted in axial alignment and having parallel twine and wire passages therein in combination with a pair of gripping jaws initially located at one sde of the spindles, power operated means for rotating the spindles, means for separating the spindles from an initial contiguous position, and means for advancing the gripping jaws to engage strands of twine located between the separated spindles.

11. A twine jointing machine having a pair of transversely movable carriers, a wire-twisting spindle mounted in each carrier and provided with a longitudinal wire passage and a parallel twine passage, a wire feeding device mounted on one of said carriers and movable transversely therewith, power operated means for rotating the spindles, and cam mechanism for moving the wire feeding device with respect to the spindle to feed wire thereto.

12. A twine jointing machine comprising a frame having a flat package-supporting top recessed in its front edge, a pair of wire-twisting spindles each having spaced twine and wire passages therein, a transversely movable carrier fo reach spindle having a flat top disposed substantially flush with the top of the frame in its said recess, a driving gear train for each spindle operative in all positions of the carriers and means for actuating said gear train.

13. A twine jointing machine comprising a pair of wire-twisting spindles arranged in end-to-end relation and having parallel twine and wire passages therein, power-operated gears for rotating the spindles about a common axis, a twine clamp located near the outer end of one spindle, and power-operated twine-tensioning mechanism located near the outer end of the other spindle.

14. A twine jointing machine comprising a pair of rotary wire-twisting spindles having longitudinal wire passages and separate twine passages for receiving overlapping ends of twine which has been passed about an article, means for supplying a single length of wire to both spindles, gear operated means for rotating the spindles from a predetermined initial position to wrap the wire about the ends of the twine, a clamp for the free end of the twine, and cam operated means timed for gripping the twine at an intermediate point and tensioning it prior to the rotation of the spindles.

15. A twine jointing machine comprising a frame, a cam shaft journaled therein, a splined shaft having a reversing chain and sprocket connection with the cam shaft, a pair of carriers transversely movable on the splined shaft and having wire-twisting spindles mounted therein and driving connections with the splined shaft, each spindle having a twine passage and a wire passage spaced from it, means for arresting the splined shaft in a predetermined intial position, means operated by the cam shaft for supplying a predetermined length of wire to the spindles, means operated by the cam shaft for moving the spindle carriers transversely to and from each other, grippers operated by the cam shaft in timed relation to the spindle movement, and a twine cutter operated by the cam shaft also in timed relation to the spindle movement.

16. A package binding machine comprising a supporting table for a package, a pair of aligned spindles located below the level of the table and each having a longitudinal twine passage and a separate wire passage, power operated means for oppositely rotating the spindles to wrap the wire about twine emerging from the twine passages, and relatively movable gripping arms operative during the spindle rotation for engaging and holding the wrapped twine lying between the adjacent ends of the spindles.

17. A package binding machine having a frame and twine jointing mechanism comprising a pair of aligned spindles mounted therein for rotary and longitudinal movement, power operated mechanism for rotating the spindles, each spindle having separate wire and twine passages, and power operated mechanism for separating the rotating spindles at first rapidly and then slowly thereby wrapping the wire about twine emerging from the twine passages in turns which are more closely wound at both ends of the joint than in its intermediate portion.

18. A twine jointing machine comprising a frame containing a pair of parallel shafts, a pair of similar carriers mounted to slide transversely on said shafts, a rotary wire twisting spindle mounted in each carrier and having a twine passage therein, a gear train enclosed in each carrier connecting one of said shafts to both of said spindles, and cam operated means for moving the carriers with their said spindles toward and from each other without interrupting the geared connection to the spindles.

19. A twine jointing machine as described in claim 18 further characterized in that the gear train includes a gear splined to one of said shafts and driven thereby.

20. A twine jointing machine having in combination a pair of aligned spindles each provided with a wire passage and a twine receiving throat, means for rotating the spindles, and a power-operated twine cutter mounted to operate adjacent to the outer end of each spindle.

21. In a twine jointing machine, a carrier unit in the form of a housing carrying a rotatable spindle provided with a wire passage and a twine receiving throat, a gear train contained in the carrier unit for driving the spindle, and a wire cutter mounted upon and movable with the housing of the carrier unit.

References Cited in the file of this patent

UNITED STATES PATENTS

| Number | Name | Date |
|---|---|---|
| 627,191 | Jacobs | June 20, 1899 |
| 826,326 | Gardner | July 17, 1906 |
| 911,931 | Armbruster | Feb. 9, 1909 |
| 985,023 | Fry | Feb. 21, 1911 |
| 1,239,560 | Brigham | Sept. 11, 1917 |
| 1,929,347 | Bustinduy | Oct. 3, 1933 |
| 2,015,927 | Gilmore | Oct. 1, 1935 |
| 2,119,765 | Zimmerman | June 7, 1938 |
| 2,129,063 | Kind | Sept. 6, 1938 |
| 2,542,686 | Le Febvre | Feb. 20, 1951 |